(12) United States Patent  
Johnson

(10) Patent No.: US 9,567,258 B2  
(45) Date of Patent: Feb. 14, 2017

(54) PICTURE FRAME WITH GLASS MAT, AND/OR METHOD OF MAKING THE SAME

(71) Applicant: Guardian Industries Corp., Auburn Hills, MI (US)

(72) Inventor: C. Brett Johnson, Brighton, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 0 days.

(21) Appl. No.: 14/268,535

(22) Filed: May 2, 2014

(65) Prior Publication Data

US 2014/0325883 A1 Nov. 6, 2014

Related U.S. Application Data

(60) Provisional application No. 61/818,728, filed on May 2, 2013.

(51) Int. Cl.
*B41M 1/12* (2006.01)
*C03C 17/25* (2006.01)
(Continued)

(52) U.S. Cl.
CPC .............. *C03C 17/25* (2013.01); *A47G 1/0633* (2013.01); *B32B 17/06* (2013.01); *B32B 17/10036* (2013.01); *B32B 17/10256* (2013.01); *B32B 17/10293* (2013.01); *B32B 17/10761* (2013.01); *B32B 17/10788* (2013.01); *B41M 1/12* (2013.01); *B41M 1/34* (2013.01); *B41M 7/009* (2013.01); *C03C 27/10* (2013.01); *B41M 5/007* (2013.01); *C03C 2217/23* (2013.01); *C03C 2217/72* (2013.01); *C03C 2218/119* (2013.01); (Continued)

(58) Field of Classification Search
None
See application file for complete search history.

(56) References Cited

U.S. PATENT DOCUMENTS 2,089,765 A * 8/1937 Shaw .............................. 40/746
3,687,770 A * 8/1972 Chase .......................... 156/221
(Continued)

FOREIGN PATENT DOCUMENTS

DE  41 00 949    7/1992
DE  196 12 371   10/1997
(Continued)

OTHER PUBLICATIONS

CeramiGlass—OPH Product Data Sheet, possibly as early as Jan. 13, 2013, pp. 1-3 (3 pp.).
(Continued)

*Primary Examiner* — Jill Culler
(74) *Attorney, Agent, or Firm* — Nixon & Vanderhye P.C.

(57) ABSTRACT

Certain example embodiments of this invention relate to picture frames with glass mats that have patterns painted and/or screen printed thereon, and/or methods of making the same. The patterns may include large blocks of one or more solid colors, textures, images, logos, licensed images/designs, arbitrary designs, and/or the like, in different example instances. The painted glass matting materials of certain example embodiments have been found to provide unique, aesthetically appealing framing-related products that enhance the quality of the original art in desirable ways.

18 Claims, 4 Drawing Sheets

(51) Int. Cl.
*C03C 27/10* (2006.01)
*A47G 1/06* (2006.01)
*B41M 1/34* (2006.01)
*B41M 7/00* (2006.01)
*B32B 17/06* (2006.01)
*B32B 17/10* (2006.01)
*B41M 5/00* (2006.01)

(52) U.S. Cl.
CPC ..... *Y10T 29/49826* (2015.01); *Y10T 29/49947* (2015.01)

(56) References Cited

U.S. PATENT DOCUMENTS

| | | | |
|---|---|---|---|
| 4,368,584 A * | 1/1983 | Logan | 40/785 |
| 5,137,560 A | 8/1992 | Ohmura et al. | |
| 5,273,780 A * | 12/1993 | Borger et al. | 101/123 |
| 5,383,990 A | 1/1995 | Tsuji | |
| 5,443,669 A | 8/1995 | Tunker | |
| 5,498,284 A | 3/1996 | Neely, Jr. | |
| 5,509,964 A * | 4/1996 | Boaz | 118/58 |
| 5,510,188 A | 4/1996 | Vockler | |
| 5,518,535 A * | 5/1996 | Boaz | C03C 8/14 106/38.3 |
| 5,681,610 A | 10/1997 | Boaz | |
| 6,138,546 A * | 10/2000 | Hursey | 83/875 |
| 6,158,247 A | 12/2000 | Didelot | |
| 6,318,125 B1 | 11/2001 | Diederen et al. | |
| 6,887,575 B2 | 5/2005 | Neuman et al. | |
| 7,056,588 B2 | 6/2006 | Neuman et al. | |
| 7,140,204 B2 | 11/2006 | Vandal | |
| 7,189,458 B2 | 3/2007 | Ferreira et al. | |
| 7,198,851 B2 | 4/2007 | Lemmer et al. | |
| 7,771,830 B2 | 8/2010 | Neuman et al. | |
| 7,998,320 B2 | 8/2011 | Laird et al. | |
| 2003/0186799 A1 | 10/2003 | Beyrle | |
| 2005/0003209 A1 | 1/2005 | Inoguchi et al. | |
| 2006/0016114 A1 * | 1/2006 | Vanderberg | 40/768 |
| 2006/0159893 A1 | 7/2006 | Carney et al. | |
| 2009/0053534 A1 | 2/2009 | Prunchak | |
| 2009/0115922 A1 | 5/2009 | Veerasamy | |
| 2009/0130195 A1 | 5/2009 | Acevedo-Duncan et al. | |
| 2010/0252544 A1 | 10/2010 | Marquet | |
| 2011/0023345 A1 * | 2/2011 | Ellingson | 40/714 |
| 2012/0164420 A1 | 6/2012 | Lemmer et al. | |
| 2012/0219821 A1 | 8/2012 | Frank et al. | |
| 2013/0273320 A1 | 10/2013 | Bockmeyer et al. | |

FOREIGN PATENT DOCUMENTS

| | | |
|---|---|---|
| WO | WO 01/42374 | 6/2001 |
| WO | WO 2012/110513 | 8/2012 |

OTHER PUBLICATIONS

International Search Report issued in Application No. PCT/US2014/021489 dated Jun. 24, 2014 (3 pp.).

* cited by examiner

PICTURE FRAME WITH GLASS MAT, AND/OR METHOD OF MAKING THE SAME

CROSS-REFERENCE TO RELATED APPLICATIONS

This application claims the benefit of U.S. Application Ser. No. 61/818,728, filed on May 2, 2013, the entire contents of which are hereby incorporated herein by reference. This application also incorporates by reference the entire contents of U.S. application Ser. No. 13/795,356, filed on Mar. 12, 2013.

FIELD OF THE INVENTION

Certain example embodiments of this invention relate to picture frames with glass mats, and/or methods of making the same. More particularly, certain example embodiments relate to picture frames with glass mats that have patterns painted and/or screen printed thereon, and/or methods of making the same. The patterns may include large blocks of one or more solid colors, textures, images, logos, licensed images/designs, arbitrary designs, and/or the like, in different example instances.

BACKGROUND AND SUMMARY OF EXAMPLE EMBODIMENTS OF THE INVENTION

Picture frames have been around for centuries. Indeed, long before the advent of modern photography (including more recent digital photography), artists sought to improve, accent, or otherwise create a desired aesthetic appearance for a painting through the use of framing. Wood, metal, plastic, composite, and other frames have been used, with and without different style mats of or including different materials.

Mats have become a standard part of picture framing. Single, double, and triple mats; box mats; and the like have become common over the years, e.g., to "pick up on," match, complement, or otherwise "interact with" colors in the underlying main image. The art and framing industry currently uses traditional fiber-based materials in matting applications in many instances.

Although the art and framing industry is large and very successful, and although traditional fiber-based materials are desirable for many matting applications, people are virtually always looking for new and creative ways to accent their artwork—regardless of whether the artwork is a photographic picture, painting, mixed media creation, or the like.

Certain example embodiments provide a new and interesting aesthetic design through the use of painted glass mats. These glass mats sometimes may also convey an interesting texture, in some instances. As an example advantage, the overall impression may help enhance the overall aesthetic appeal of the artwork and the frame.

One aspect of certain example embodiments of this invention therefore relates to glass mats that have patterns painted and/or screen printed thereon, and/or methods of making the same, e.g., for use in framing-type applications. The patterns may include large blocks of one or more solid colors, textures, images, logos, licensed images/designs, arbitrary designs, and/or the like, in different example instances. The painted glass matting materials of certain example embodiments have been found to provide unique, aesthetically appealing framing-related products that enhance the quality of the original art in desirable ways.

In certain example embodiments, a method of making a frame is provided. A water-inclusive paint is screen printed, directly or indirectly, on a major surface of a first glass substrate in a desired pattern in connection with a screen mesh that has at least 100 threads per inch and while maintaining an environment that has a relative humidity of at least 80% over and/or proximate to the screen mesh. The water-inclusive paint at least initially comprises 20-50 wt. % sodium silicate inclusive material(s). The paint is bonded to the first glass substrate in the desired pattern by heating the first glass substrate to a peak temperature that is no higher than 400 degrees C. The first glass substrate is heat treated, following the bonding, at a temperature of at least 580 degrees C., with the paint remaining on the first glass substrate in the desired pattern and with a desired coloration following said heat treating.

In certain example embodiments, a method of making a glass mat inclusive picture frame is provided. The method includes applying, in connection with one more materials chosen from enamels, lacquers, and paints, a desired pattern on a first major surface of a glass substrate. The one or more materials on the first major surface of the glass substrate may be cured. Following the curing, a central portion of the glass substrate may be cut out to create a hole having a size and shape selected to accommodate a picture of a defined size and form a glass mat. A cover substrate is coupled to the glass mat in making the picture frame.

In certain example embodiments, a method of making a plurality of picture frame products is provided. One or more desired patterns is/are screen printed, in connection with one more paints, on a first major surface of a large area glass substrate. The one or more paints is/are cured. Following the curing, the large area glass substrate is cut into a plurality of glass blanks of one or more predetermined sizes, with each said glass blank having a desired pattern registered thereon. Central portions of each of the glass blanks are cut out to create holes having respective sizes and shapes selected to accommodate pictures of defined sizes and to form corresponding glass mats.

In certain example embodiments, a method of making a picture frame product comprising a glass substrate and a colored film is provided. A paint is screen printed, directly or indirectly, on a major surface of the substrate in a desired pattern, while maintaining an environment with a relative humidity of at least 80% over and/or proximate to a screen mesh used in the screen printing. The substrate with the paint thereon is heated. The paint is (a) fully cured when heated to a first temperature of 250-400 degrees C., and (b) substantially fully cured when heated to a second temperature below 175 degrees C., in making the coated article.

In certain example embodiments, a method of making a picture frame is provided. A colored paint material is printed, directly or indirectly, on a major surface of a first glass substrate in a desired pattern in connection with a mesh that has at least 100 threads per inch, with the colored paint material being pushed through the mesh in connection with hydraulic forces that account for a sheer thinning property of the colored paint material by balancing (a) squeegee speed, (b) squeegee angle relative to the mesh, and (c) hardness of the squeegee. The first glass substrate with the colored paint material thereon is heated to a first temperature sufficient to at least partially cure the colored paint material. The colored paint material is bonded to the first glass substrate in the desired pattern by heating the first glass substrate to a peak temperature that is no higher than 400 degrees C.

In certain example embodiments, a picture frame may be made according to a method described herein.

In certain example embodiments, a method of making a laminated picture frame product is provided, with the method comprising (for example) booking together a second glass substrate and a picture frame product made according to a method described herein.

The features, aspects, advantages, and example embodiments described herein may be combined to realize yet further embodiments.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION OF EXAMPLE EMBODIMENTS OF THE INVENTION

Certain example embodiments of this invention relate to glass mats that have patterns painted and/or screen printed thereon, and/or methods of making the same, e.g., for use in framing-type applications. The patterns may include, for example, large blocks of one or more solid colors, textures, images, logos, licensed images/designs, arbitrary designs, and/or the like, in different example instances. The painted glass matting materials of certain example embodiments have been found to provide unique, aesthetically appealing framing-related products that enhance the quality of the original art in desirable ways. Certain example embodiments thus advantageously utilize glass-based matting to provide an aesthetically flexible and potentially vibrant alternative to existing fiber-based solution.

Figure 1:
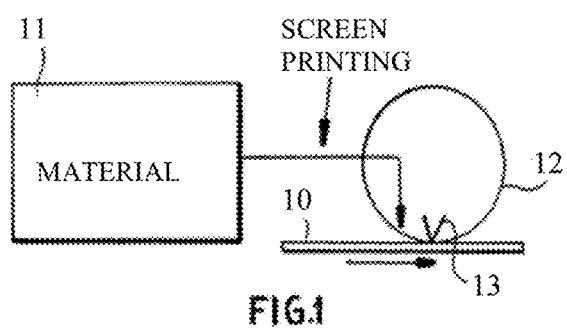
FIGS. 1-4 illustrate a technique for making a glass mat subassembly for a picture frame in accordance with certain example embodiments.

FIGS. 1-4 illustrate a technique for making a glass mat subassembly for a picture frame in accordance with certain example embodiments. Referring to FIG. 1, the screen printing process includes a first glass substrate 10 screen printed in connection with a silk-screen drum 12 and wiper or doctor blade 13. The silk-screen drum 12 and wiper or doctor blade 13 cooperate to print a material 11 onto a surface of the substrate 10 in a desired pattern. It is noted that as an alternative to printing drums, substantially flat, two-dimensional silk-screens sometimes are stretched into metal frames, with a silk-screen being stationary and a squeegee and flood bar being passed mechanically over the screen. The desired pattern may be a solid or stylized "frame" around one or more edges of the substrate, e.g., to simulate a mat for a picture, while leaving an open area for the picture to "show through." The desired pattern may also be a solid coating over all or substantially all of the substrate.

Figure 2:
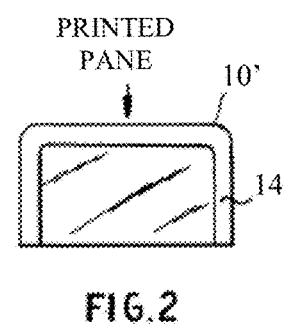
Figure 3:
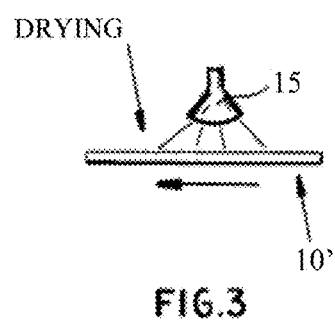

Referring to FIG. 2, the screen-printed substrate 10' includes a screen-printed layer 14 arranged in a frame-like pattern. That is, the layer 14 in the FIG. 2 example is applied to peripheral areas of the first substrate 10 to form a decorative perimeter band. The screen printed substrate 10' may be dried using a heat source 15 (e.g., a convection-based drying oven, one or more infrared (IR) lamps, one or more ultraviolet (UV) lamps, microwave radiation, etc.), e.g., as shown in FIG. 3. Staged heating may be used in certain example embodiments, e.g., to first "pre-cure" the material (and potentially drive off volatile materials that may be included in the material) then fully fire the material to the substrate.

Once the applied (and possibly opaque) material 14 is dried via the pre-curing process, the screen printed substrate 10' may be used as the glass for a frame, e.g., in connection with a single pane embodiment. Furthermore, the screen printed substrate 10' may be oriented such that the layer 14 is provided as either the first or second surface in different example embodiments.

Figure 4:
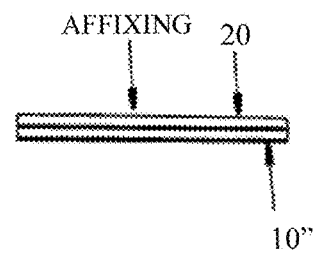

The screen-printed substrate 10' also may be used in connection with multi-pane embodiments. In such cases, a center portion of the screen-printed substrate 10' may be cut out or otherwise removed, e.g., to "make room" for the picture to be visible through the frame, much like a traditional fiber-based mat would be oriented around a picture. As shown in FIG. 4, for example, a cutout mat 10", generated from the screen printed substrate 10' discussed above and shown in FIG. 3, may be affixed to a second substrate 20. The cutout mat 10" may be oriented such that the layer 14 is provided as any one of the first, second, third or fourth surfaces in different example embodiments. The second substrate 20 may be a cover substrate that is closest to the viewer of the picture (e.g., when the layer 14 is provided on the third or fourth surface).

Although not shown in FIG. 4, the second substrate 20 and the cutout mat 10" may be adhered to one another in any suitable manner. For instance, polyvinyl butyral (PVB), ethyl vinyl acetate (EVA), polyethylene terephthalate (PET), polymethyl methacrylate (PMMA), polyurethane (PU), and/or the like, may be used to create a laminated product, provided that they do not significantly interfere in undesirable ways with the aesthetic appearance of the frame and mat. In other example embodiments, the frame may have channels or grooves so as to accommodate the second substrate 20 and the cutout mat 10", respectively, and hold them in a desired position relative to one another and/or the frame. In still other cases, tapes (including double-sided tapes), small clamps, and/or other mechanical fasteners may be used to hold the second substrate 20 and the cutout mat 10" in a desired position relative to one another and/or the frame. The frame may be used to help conceal such mechanical fasteners in certain example embodiments.

It is noted that in both single-pane and multi-pane embodiments, the substrates may be bent, e.g., to provide a curved article suitable for framing-type applications.

A wide range of materials may be used to generate the layer 14. The material that may be used in certain example embodiments includes paint, enamel, lacquer, and/or any other type of material that may be used to produce decorative colored layers. In certain example embodiments, the material may involve an enamel generally comprising pigments and glass frit. Enamel 144001 black 801029 from the company FERRO, enamel AF2600-65-96 from the company JOHNSON MATTHEY, and enamel TEMPVER bianco 3400-06-011 or 3400-147A from the company FENZI may be suitable candidates for certain example embodiments.

Certain example embodiments may involve a paint material that would not necessarily be regarded as a frit. The paint material that may be used in certain example embodiments may have inorganic base components, as materials with purely organic bases and conventional paints may not survive the high temperatures associated with glass bending processes, laminating substrates together, and/or the like, and because it likely will be difficult to apply such materials to post-bent products. The paint material that may be used in certain example embodiments may have a low volatile content (e.g., to limit emissions and/or outgassing during manufacturing processes) and the ability to substantially or fully cure at temperatures significantly lower than those required to fire traditional frits and/or bend glass. Cerami-Glass, manufactured by Industrial Control Development, Inc., is one example material that includes fewer volatiles than ceramic frits and has found to be a suitable candidate for certain example embodiments, as it has these desirable properties. This water-inclusive material is described in U.S. Pat. No. 5,510,188, which is incorporated herein by reference. Of course, other materials that meet the desired characteristics specified herein also may be used in connection with different example embodiments.

A water-inclusive and/or water-based material that may be used in connection with certain example embodiments may be of or include a pigment, aqueous silicate solutions, alkali metal hydroxide, colloidal silica, and feldspar. More particularly, the material may be of or include (a) pigment; (b) an aqueous sodium silicate solution wherein the weight ratio of $SiO_2$ to $Na_2O$ is approximately 3; (c) an aqueous sodium silicate solution wherein the weight ratio of $SiO_2$ to $Na_2O$ is approximately 2; (d) an aqueous potassium silicate solution wherein the weight ratio of $SiO_2$ to $K_2O$ is approximately 2; (e) a colloidal silica thickening agent; (f) an aqueous alkali metal hydroxide solution; and/or (g) feldspar. The pigment may be a high temperature-resistant pigment including one or more metals and/or metal oxides, clay, and/or the like. For instance, the following and/or other materials may be used as pigments: iron, titanium, zinc, copper, and/or oxides thereof. The pigments may be provided in dry or powdered form, or in aqueous dispersions. An example material includes:

| Ingredient | Amount (Wt. %) |
|---|---|
| High temperature-resistant pigment | 37 to 43% |
| Aqueous sodium silicate solution ($SiO_2$ to $Na_2$ weight ratio ≈3) | 11 to 16% |
| Aqueous sodium silicate solution ($SiO_2$ to $Na_2O$ weight ratio ≈2) | 15 to 24% |
| Aqueous potassium silicate solution ($SiO_2$ to $K_2O$ weight ratio ≈2) | 15 to 20% |
| Colloidal silica | 0.5 to 3% |
| Aqueous alkali metal hydroxide solution (30-60 wt. % conc.) | 3 to 7% |
| Feldspar | 1.5 to 3% |

Certain example embodiments preferably involve a paint that, at least initially, comprises 15-55 wt. % sodium silicates, more preferably 20-50 wt. % sodium silicates and, for example, is 26-40 wt. % sodium silicates. Additional silicate material may be provided, e.g., preferably in an amount that at least initially is 5-35 wt. % silicate material, more preferably 10-30 wt. % silicate material and, for example, may be 15-20 wt. % silicate material. Additional pigments and/or colorants may be added to achieve a desired coloration in connection with the fired product.

Another desirable property of the paint material that may be used in certain example embodiments is that it may help to avoid imparting significant residual stress on the glass substrate, e.g., resulting from a mismatch in coefficients of thermal expansion (CTEs) during glass bending and/or laminating processes. A CTE difference between the paint and the glass substrates preferably will be no more than 25%, more preferably no more than 15%, and still more preferably no more than 10%, e.g., under the elevated temperature conditions associated with a bending furnace or lehr. In certain example embodiments, the final induced surface stress directly under the paint preferably will be less than 500 psi, more preferably less than 250 psi, and still more preferably less than 150 psi, where curved substrates are involved.

Water-inclusive materials may be used in certain example embodiments, as this may help avoid having to manage volatiles that can create stains and/or other issues as they outgas. Such materials also may be desirable because they have a curing temperature that is sufficiently low to help reduce issues of sticking and/or bonding during double lite bending process. It has been observed, however, that such water-inclusive materials may nonetheless present certain challenges, especially when used with more conventional screen printing techniques. For instance, the shear thinning characteristic of a water-inclusive material typically will involve significantly different printing process conditions than prior art frit-related approaches (e.g., where conventional ceramic frits and/or enamels are used). Additionally, the nature of the material in combination with using water as the solvent may sometimes cause the material to air dry extremely quickly, e.g., when laid as a thin film. But because glass may be printed using a silk screen process that typically leaves the opaque material as a thin film on the substrate with every printing cycle, rapid drying of a water-inclusive material may lead to a loss of print features and/or resolution. The probability of loss is particularly high for higher definition print features such as characters, dots, logos, licensed images/designs, detailed images, and/or the like. Even larger print features may be lost in some cases. Moreover, because some material may be left on the screen, it may dry and generate clogs that present subsequent printing problems.

Figure 5:
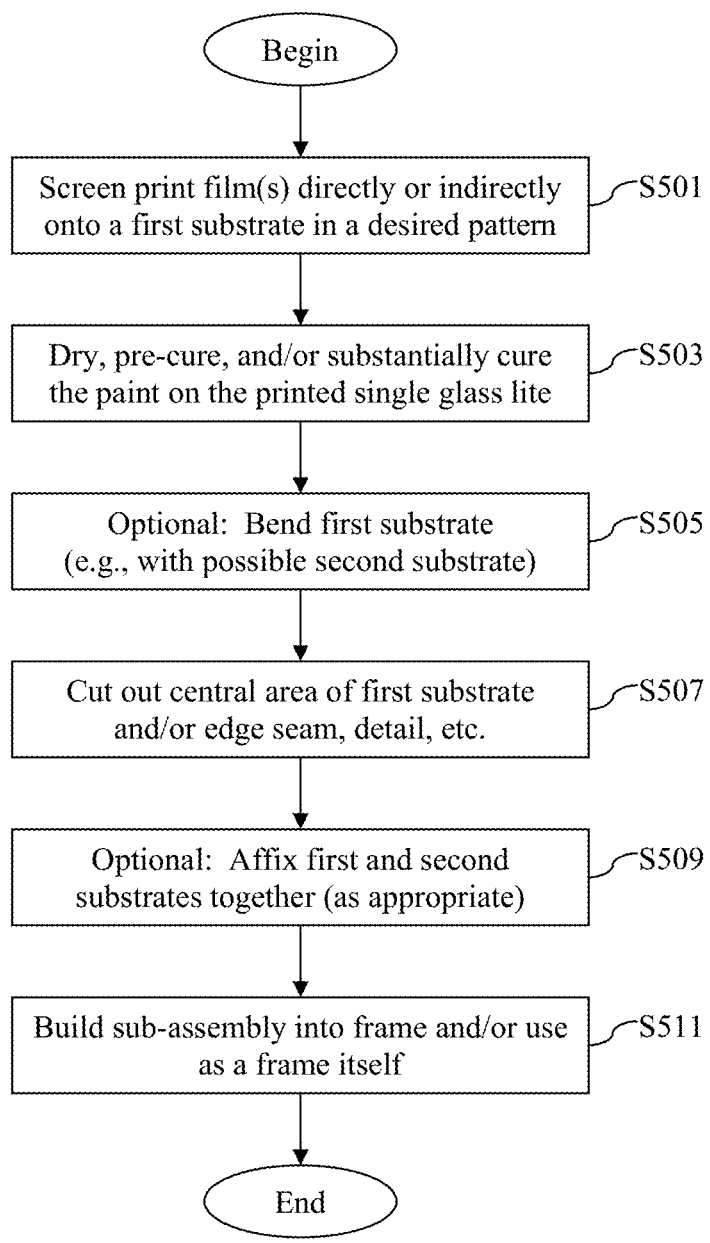
FIG. 5 is a flowchart illustrating an example method of making a frame including a glass mat subassembly in accordance with certain example embodiments.

It has, however, been discovered that process modifications can be made that enable conventional screen printing techniques to be used in connection with a class of paints that have the desired properties discussed above and, referring once again to the drawings, FIG. 5 is a flowchart illustrating an example method of making a frame including a glass mat subassembly in accordance with certain example embodiments. In step S501, a film is screen printed directly or indirectly onto a first substrate. Because of the shear thinning properties of a water-inclusive material noted above, the water-inclusive film may be screen printed using a smaller mesh screen and/or in connection with significantly higher printing squeegee and flooding speeds, as compared to prior art techniques. For instance, it has been found that a smaller screen mesh is desirable. A screen mesh that includes greater than about 200 threads per inch is preferable, although a screen mesh with about 210 threads per inch or more is more preferable, and a screen mesh with about 220 threads per inch is yet more preferable.

It also has been observed that conventional screen printing approaches rely heavily on the sheer force generated between the squeegee and screen. The water-inclusive material of certain example embodiments may, however, benefit from an increase in hydraulic forces that help to push the paint through the screen and control the resulting deposit. Suitable hydraulic forces may be achieved by optimizing or otherwise tuning some or all of the squeegee speed, squeegee angle relative to the screen, and/or the hardness or durometer of the squeegee material. Although a conventional set of parameters for these factors would suggest to an operator that printing with the material of certain example embodiments is impossible, it has been found that it is possible to modify these factors, alone and in combination, to produce high-quality and high-resolution prints. The following operating parameters have been found to be suitable for use in certain example embodiments and are provided by way of example:

| Parameter | Preferred | More Preferred | Most Preferred |
|---|---|---|---|
| Squeegee print speed (mm/sec) | 200-1500 | 350-1250 | 500-1000 |
| Squeegee flood speed (mm/sec) | 200-1200 | 300-1000 | 400-600 |
| Squeegee durometer (or hardness, in shore A) | 25-80 | 40-65 | 50-55 |
| Squeegee angle (e.g., for squeegee holder, in degrees from horizontal) | 45-89 | 60-85 | 70-75 |

In addition, or in the alternative, to help reduce the likelihood of rapid drying and loss of image detail, the water-inclusive film may be screen printed in an atmosphere with increased humidity, when compared to prior art methods. In this regard, in certain example embodiments, the direct atmosphere over and/or proximate the screen may be set at least at about 80 percent relative humidity, and more preferably about 90-95 percent relative humidity. The increased humidity may be achieved by humidifying the entire printing area in certain example implementations. In other example implementations, it may be more preferable to create a cool mist more directly over and/or proximate the entire or substantially the entire screen. The mist may be provided using any suitable apparatus. For example, one or more ultrasonic and/or steam foggers may be used to increase the relative humidity to the desired levels. When one or more steam foggers is/are used, it may be desirable to keep heat associated therewith remote from the screen, e.g., using heat sinks, cooling fins, fans, and/or the like. Ultrasonic foggers generally generate less heat and also generally require less energy to operate and, as a result, may be more desirable and may not need to use cooling techniques.

Once the paint is applied to the substrate, the paint on the printed single glass lite that supports the coating may be dried and/or substantially fully cured or pre-cured, as indicated in step S503. The example materials contemplated herein preferably are fully cured, and have processing characteristics similar to fully fired frits, when heated to a temperature preferably below 225 degrees C., more preferably below 200 degrees C., and still more preferably below 175 degrees C. In some cases, the paint of certain example embodiments may be fully cured by heating to 125-150 degrees C. (257-302 degrees F.).

It is noted that one or more screen printing operations may be carried out to obtain the desired end product's pattern. Multiple printing operations may be consolidated and/or distributed so as to take place before and/or after the initial heating in step S503.

The first glass substrate with the now substantially fully cured and/or pre-cured coating thereon may be heated and bent in step S505, e.g., where it is desirable to provide a curved frame. This may include, for example, stacking first and second substrates together and bending them together using a high-temperature heating process in certain example embodiments, e.g., in situations where it is desirable to have a bent product comprising multiple panes glass where the curvatures match very closely with one another. If the substrates are assembled in the desired stack and to be bent in the bending lehr relatively soon after this curing, then these lower temperatures have been found to be sufficient for creating high resolution patterns with acceptable process outputs and products.

It has, however, been observed that the paint may be subject to corrosion if cured at this lower temperature but exposed to humidity over an extended period of time. Thus, if there is a desire to store the cured material for extended periods before forming in the bending lehr, then it may be desirable to proceed with an elevated pre-cure temperature. For example, a temperature of at least 300 degrees C. for 4 minutes has been found to result in the complete or near complete elimination of the organic components that could lead to defects or discoloration while the intermediate product is in storage. In general, temperatures in the range of 200-500 degrees C., more preferably 250-400 degrees C., and times of 1-10 minutes, more preferably 2-5 minutes, are appropriate, although other temperatures and/or times may be used in different embodiments.

In the case of the lower temperature curing suitable for situations where it is envisioned that the intermediate products will not be stored for very long, temperatures associated with glass bending (e.g., 600-640 degrees C.) may be used to complete the curing process. These temperatures may or may not be useful in achieving final curing for situations where it is anticipated that the intermediate products will be stored and/or where prolonged exposure to humidity is possible, although the bending will expose the intermediate product to such elevated temperatures in any event. It has been found that in both cases, the bending process does not promote significant (and sometimes any) staining, discoloration, and/or the like, e.g., associated with outgassing. It similarly has been found that in both cases, the bending process does not promote significant (or sometimes any) sticking of the plies together.

It is noted that high threads per inch counts may be used in connection with embodiments where it is desirable to provide for high resolution patterns. However, it is noted that "full flood" does not require the same high resolution to print images. Thus, a mesh count generally in the 100s will work. It therefore will be appreciated that the threads per inch may be from about 100-200 and the threads per inch may be selected so as to achieve full flood in certain example embodiments.

In step S507, the central area of the first substrate may be cut out, as appropriate. Additionally, or in the alternative, edge seaming and detailing (e.g., adding bevels, notches, ribs, etc.) may be performed.

If the substrate is to be used in a multi-pane embodiment, in step S509, the substrates may be laminated to one another (e.g., using a polymer based or plastic interlayer such as, for example, PVB, EVA, PU, PET, PMMA, and/or the like) and/or otherwise connected to each other (e.g., via mechanical means such as, for example, those set forth above). The subassembly may be built into or used as a frame in step S511.

The techniques of certain example embodiments may be advantageous for a number of reasons. For instance, the pre-curing process prior to booking the lites together and performing the double lite bending associated with certain example embodiments may involve less energy than conventional approaches, e.g., as the peak temperature preferably is about 300 degrees C. or lower, as opposed to conventional frits that typically are pre-cured at temperatures of 550 degrees C. or higher. As set forth above, in other example embodiments, a suitable water-inclusive film may be pre-cured at an even lower temperature, e.g., about 125 degrees C.

Reducing the energy required to pre-cure the layer may reduce the cost of making a coated article and, thus, the frame. In some instances, existing equipment used to dry solvents from typical frit materials may be used to pre-cure the water-inclusive layer. In those instances, additional capital equipment may not be required for these purposes, and certain example embodiments therefore may be implemented in connection with existing screen printing lines.

Certain example embodiments also may reduce the possibility of optical distortions such as staining and the like, e.g., from the outgassing of volatiles. Certain example embodiments also may reduce the likelihood of the first and second substrates fusing or sticking together while being heated and bent.

Reducing the pre-cure temperature also may reduce the potential for distortions and/or residual stresses being introduced in the substrate supporting the screen printed coating. By contrast, residual stress and distortion from high temperature pre-curing is known to cause shape variations and residual stress issues in final laminated products. Optical distortions (e.g., haze) resulting from such processes also can be reduced in certain example instances.

In certain example embodiments, the film will not contain heavy metals or other hazardous material that sometimes is found in prior art frits. Thus, certain example embodiments may improve the safety of the manufacturing process and present a reduced set of environmental challenges.

Although certain example embodiments refer to water-inclusive materials and/or the like (e.g., because they may include a large percentage of aqueous and/or other water-related materials), certain example embodiments may include alternate agents that have less than 50% water and/or use alternate base materials.

In a similar sense, alternative pigments may be used in different example embodiments, e.g., such that the paint is no longer opacifying and/or no longer creates an opaque film. For example, a wide variety of colors could be used in connection with a host of alternative pigments, e.g., to create articles with desired painted patterns that are opaque and/or at least partially light transmissive. In certain example embodiments, one or more colors may be screen printed on a substrate to create one or more desired patterns thereon. In certain example embodiments, at least a portion of the substrate will have a pattern screen printed thereon. This may include, for example, painting a pattern on one or both major surfaces of the substrate, e.g., over only a portion and/or substantially the entire area(s) thereof. One example is a single, substantially uniform color being screen printed on the entire or substantially the entire major surface(s) of the substrate.

The ability to use large stock sheets and then cut out the inner sections to create mats may be particularly scalable and result in a large cost savings. In other words, a large stock glass sheet may be blanketed with a screen printing process, e.g., operating in full flood conditions or may have the material 14 applied by any one or more known wet coating methods (that may be the same or different in subsequent passes). Such wet coating methods may include, for example, spray systems, curtain coaters, dip coaters, slot die and meniscus apparatuses, roll coating techniques, etc. An example coating apparatus is disclosed in U.S. Pat. No. 6,383,571, the entire contents of which are hereby incorporated herein. It has been found that by implementing a pressurized system where a hydrostatic pressure is built up in a cavity from which paint is allowed to flow out (under pressure) from a well-machined and uniform "slot," the paint can be uniformly applied to the glass substrate and create a uniform or substantially uniform visible appearance. Thixotropic materials that are sometimes even heat treatable can be applied in a uniform or substantially uniform manner, particularly when the slot gap size and/or shape, flow geometry within the body of the die, application line speed, and length of the slot are controlled. For thixotropic materials, a good coating quality can be obtained when the slot gap is 2-12, more preferably 4-x, times the desired wet coating thickness (e.g., in terms of diameter or major distance). An example wet coating thickness is 2 mils, although wet coatings may be up to 20 mils, more preferably up to 15 mils, and still more preferably up to only about 10 mils.

The sheet may be cut to blanks having desired sizes, e.g., based on the outer dimensions desired for each mat. Then, the central regions of the blanks may be cut out.

Additionally, or in the alternative, strips of desired lengths and widths, and optionally with additional added physical details (such as beveled edges, rounded corners, etc.), may be cut from a large stock sheet. Multiple strips may be assembled into a desired mat pattern in certain example embodiments. This technique may be less wasteful as compared the approach where central portion cutouts are generated and potentially discarded as being too small to be used.

One or more of the substrates may be heat treated (e.g., heat strengthened and/or thermally tempered), and/or chemically tempered, in certain example embodiments. The terms "heat treatment" and "heat treating" as used herein mean heating the article to a temperature sufficient to achieve thermal tempering and/or heat strengthening of the glass inclusive article. This definition includes, for example, heating a coated article in an oven or furnace at a temperature of at least about 550 degrees C., more preferably at least about 580 degrees C., more preferably at least about 600 degrees C., more preferably at least about 620 degrees C., and most preferably at least about 650 degrees C. for a sufficient period to allow tempering and/or heat strengthening. This may be for at least about two minutes, or up to about 10 minutes, in certain example embodiments. The heat treatment may be performed at any suitable phase in the process. For example, the heat treatment may be performed before and/or after the screen printing, and after sizing. In multi-pane embodiments, the mat glass and/or the cover glass may be heat treated and/or chemically tempered.

Thus, it will be appreciated that certain example embodiments may involve a heat treated substrate with a substantially uniform, colored at least partially opaque layer disposed over all or substantially all of a major surface of the glass substrate and thus potentially over all or substantially all of a major surface of the glass mat. That substrate may be bent and/or left flat.

It has been realized that the example techniques described herein can be used to improve this process by, for example, applying a material that does not need to be fired above 500 degrees C. to fully adhere to the glass. Firing at this elevated temperature in some ways "saves" a process step by combining heat treatment with the high-temperature firing process, the heat treatment process results in the glass being quenched, which introduces residual stresses in the glass that effectively prevents it from being cut and/or sized. However, using this approach, the glass substrates generally will have to be pre-cut and/or sized prior to the heat treatment, which can make it difficult to reach economies of scale, e.g., by applying coatings to large stock sheets that can be cut to size. But because the paints of certain example embodiments can be fired at a lower temperature and reach full bonding strength as a part of this process, the glass can be left in the annealed state and cut and/or sized at a later time. This approach therefore advantageously enables coating, painting, and/or other processes to take place in connection with large stock sheets of annealed glass that can later be sized, tempered, and built into intermediate and/or final products.

Figure 6:
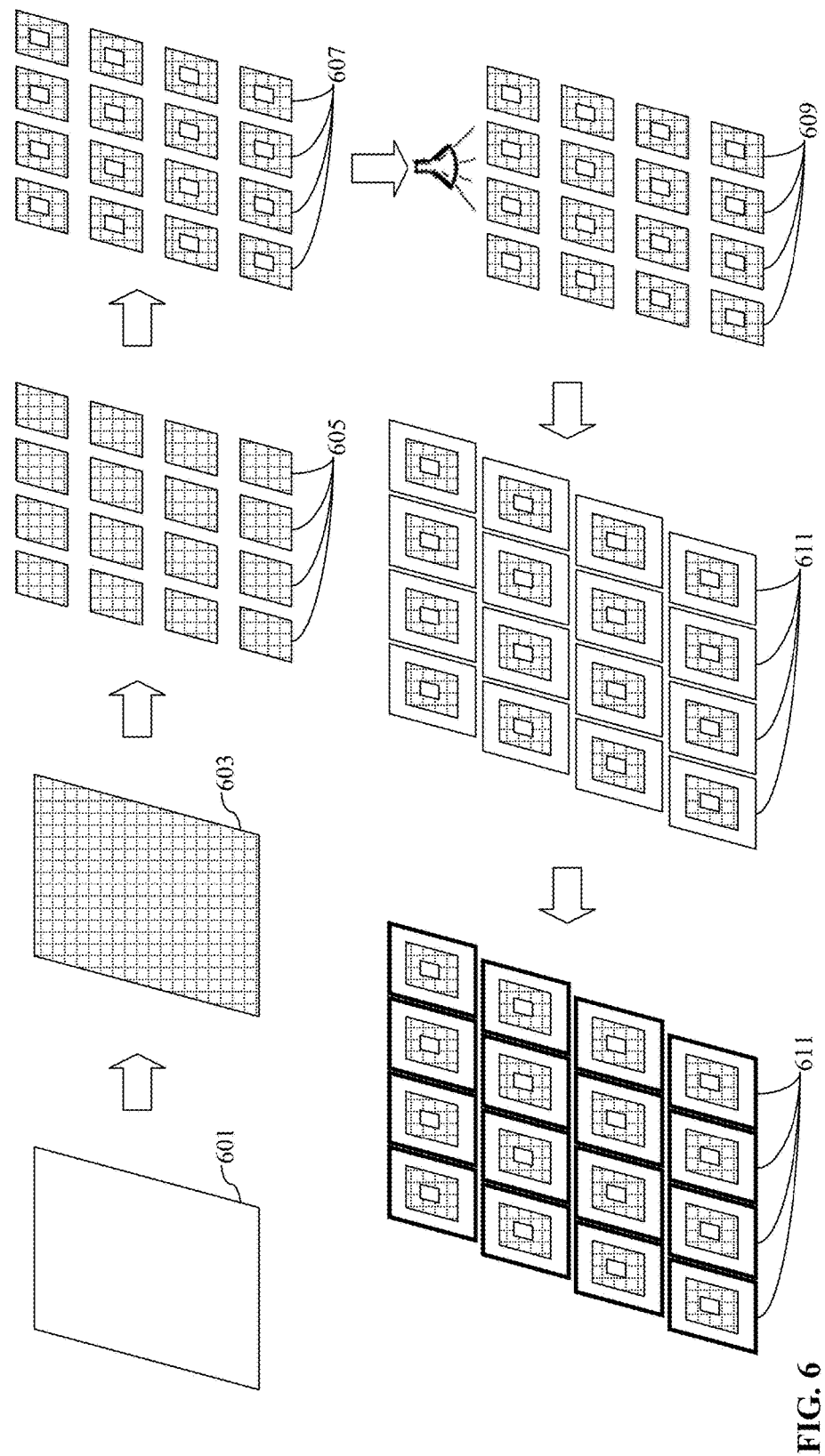
FIG. 6 is a schematic view demonstrating a processing flow that may be used to create multiple glass mat picture frames in accordance with the example embodiments discussed herein.

FIG. 6 is a schematic view demonstrating a processing flow that may be used to create multiple glass mat picture frames in accordance with the example embodiments discussed herein. A large stock sheet 601 is provided. The large stock sheet 601 then is screen printed in a desired manner, e.g., such that a pattern 603 is produced in a repeating or other manner over one or both major surfaces thereof. It is noted that the pattern 603 may be a single color in certain example embodiments. The resulting large stock sheet 601 with the pattern 603 thereon is then sized to produce multiple smaller sheets 605. It is noted that the multiple smaller sheets 605 may have the same or different sizes and may have the same or different patterns. For example, the large stock sheet 601 may be cut to blanks that are sized in a manner suitable for matting pictures that are 3"×5", 5"×7", 8"×10", etc., and a single large stock sheet 601 may be used to produce blanks with some or all of these and/or other sizes. Custom sizing also is an option. The pattern 603 printed on the large stock sheet 601 may take into account the different sizes in certain example embodiments and, thus, may be defined so that individual smaller patterns are registered for the smaller sheets 605. As a part of the sizing process, edge seaming may be performed, e.g., to reduce the presence of sharp edges that could in some situations be dangerous.

The blanks 605 may be cut out or forwarded to a fabricator to be cut out, e.g., to effectively turn the blanks 605 into continuous mats 607 in certain example embodiments. Beveling, mitering, notching, etc., may be performed, as well. The mats 607 may be rectangular, circular, ovular, or have other shapes (e.g., they may be cathedral shaped, have rounded corners, etc.). In other example embodiments, multiple pieces of glass material may be assembled to create continuous mats 607. In still other embodiments, the mat may be left uncut and used in a single pane product and/or in a multi-pane product where the artwork is additionally protected. Optionally, the continuous mats 607 may be heat treated, chemically tempered, and/or the like, to create stronger mats 609.

The mats 607 may be matched with, and affixed to, cover substrates, to create subassemblies 611 in certain example embodiments. The cover substrates may be glass, plastic, and/or any other suitable material. In certain example embodiments, the cover substrates may be hot bent with the mats 607, e.g., as part of a laminating process. In other cases, the cover substrates and the mats 607 may be simply laminated or otherwise mechanically attached to one another. The subassemblies may have outer wood, plastic, composite, or other frame and frame-related components (such as, for example, backs, hooks, wires, stands, and/or the like) connected thereto to create framing products 613.

Figure 7:
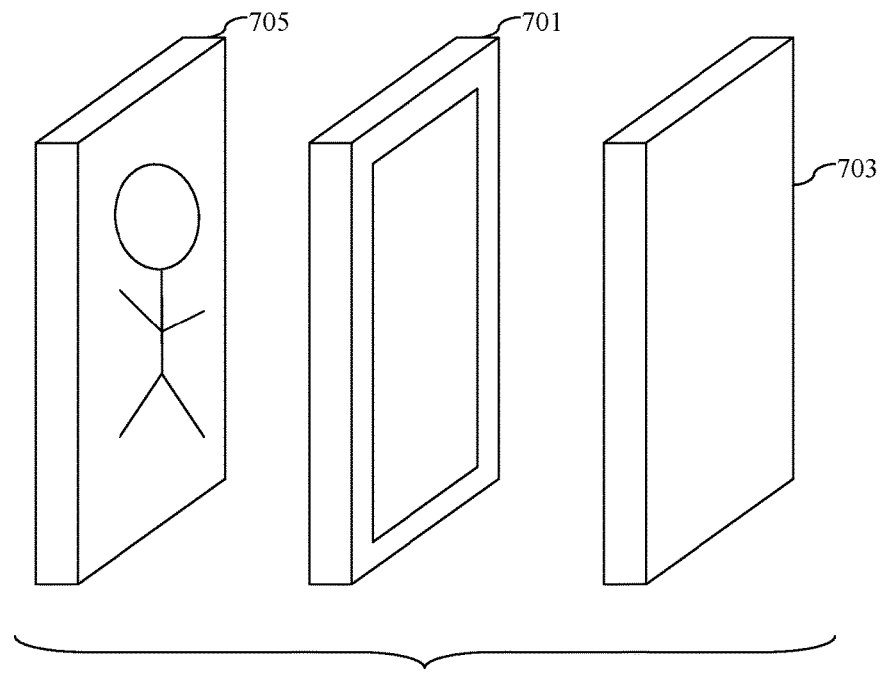
FIG. 7 is an exploded schematic view of a glass mat subassembly in connection with certain example embodiments.

FIG. 7 is an exploded schematic view of a glass mat subassembly in connection with certain example embodiments. The glass mat 701 is sandwiched between the cover substrate 703 and the picture 705. The glass mat 701 has a screen printed surface adjacent to the cover substrate 703 and/or the picture 705, e.g., with a desired pattern in one or more colors incorporating one or more shapes, designs, design elements, trademarked images, logos, licensed images/designs, and/or the like. Although not shown in the FIG. 7 schematic view, the glass mat 701 and the cover substrate 703 may be affixed together with a laminating material and/or mechanical fasteners. A backing member (e.g., a semi-rigid felt-covered material and/or the like) with optional hanging and/or stand members may be provided behind the picture 705 such that it is on a side of the picture opposite the mat 701.

The cover substrate 703 may be of or include any suitable transparent or semi-transparent material such as glass, plastic, and/or the like. In certain example embodiments, the glass may have a UV blocking coating and/or an antireflective (AR) coating applied to one or both major surfaces thereof.

Figure 8:
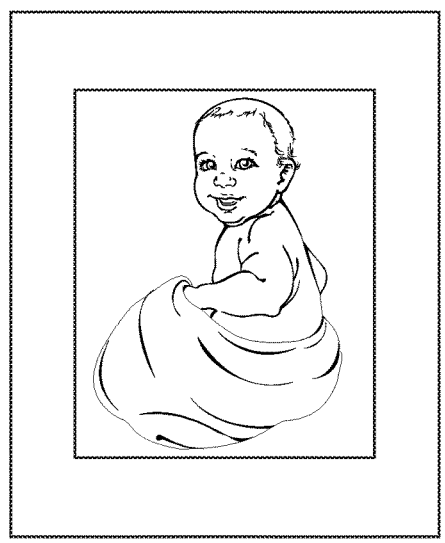
FIGS. 8-9 show black and white images provided in glass mat frames made in accordance with certain example embodiments.
Figure 9:
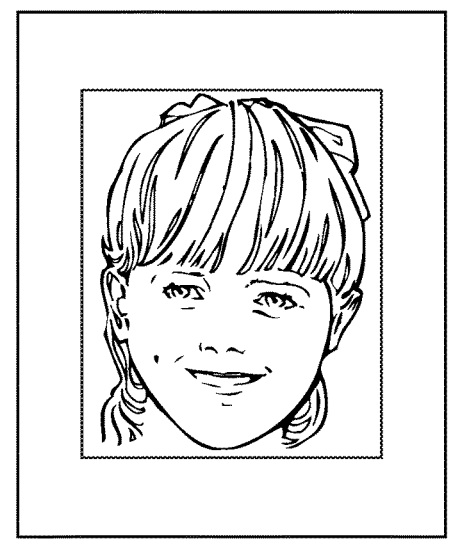

FIGS. 8-9 show black and white images provided in glass mat frames made in accordance with certain example embodiments. The mats in FIGS. 8-9 were generated using the same technology the assignee of the instant application uses to create its Deco Crystal products. It can be seen that the glass mat inclusive frame is advantageous in that it enhances the aesthetic quality of the original art (in this case, the photographs). Although FIGS. 8-9 are provided in black-and-white, the glass-based picture frame mat of certain example embodiments can be provided in a multitude of colors and/or patterns to accent the hues of the art. Providing a glass mat also produces an interesting texture that is different from standard fiber- and/or paper-based matting and is appealing from an aesthetic standpoint in some instances.

Although certain example embodiments have been described in connection with paints and the like, the material 11 may be of or include, for example, a ceramic frit, in some cases. As is known, ceramic frits typically are composed of ground glass with a specific softening point combined with metals and oxides (e.g., bismuth (and/or an oxide thereof), nickel (and/or an oxide thereof), chromium oxide, cobalt oxide, and/or nickel oxide, etc.) to attain the desired color (often a dark or black color), adhesion properties, durability, etc.

Although certain example embodiments have been described in connection with double lite bending techniques, it will be appreciated that the example techniques disclosed herein may be used in connection with single lite bending techniques.

While a layer, layer system, coating, or the like, may be said to be "on" or "supported by" a substrate, layer, layer system, coating, or the like, other layer(s) may be provided therebetween. Thus, for example, the paints, coatings, and/or layers described above may be considered "on" and "supported by" the substrate and/or other paints, coatings, and/or layers even if other layer(s) are provided therebetween.

In certain example embodiments, a method of making a frame is provided. A water-inclusive paint is screen printed, directly or indirectly, on a major surface of a first glass substrate in a desired pattern in connection with a screen mesh that has at least 100 threads per inch and while maintaining an environment that has a relative humidity of at least 80% over and/or proximate to the screen mesh. The water-inclusive paint at least initially comprises 20-50 wt. % sodium silicate inclusive material(s). The paint is bonded to the first glass substrate in the desired pattern by heating the first glass substrate to a peak temperature that is no higher than 400 degrees C. The first glass substrate is heat treated, following the bonding, at a temperature of at least 580 degrees C., with the paint remaining on the first glass substrate in the desired pattern and with a desired coloration following said heat treating.

In addition to the features of the previous paragraph, in certain example embodiments, following said bonding and prior to said heat treating, the first glass substrate may be cut to a desired size.

In addition to the features of either of the two previous paragraphs, in certain example embodiments, the first glass substrate may be heated with the paint thereon to a first temperature sufficient to at least partially cure the paint in the desired pattern, with the first temperature being lower than the peak temperature.

In addition to the features of the previous paragraph, in certain example embodiments, the peak temperature may be at least twice as high as the first temperature.

In addition to the features of either of the two previous paragraphs, in certain example embodiments, the first temperature may be about 125-150 degrees C. and may cause at least a majority of organic components provided in the paint to be driven off.

In addition to the features of the previous paragraph, in certain example embodiments, the first temperature may be held for about 4 minutes.

In addition to the features of any of the six previous paragraphs, in certain example embodiments, the screen mesh may have fewer than 200 threads per inch, with the threads per inch being selected so as to achieve full flood.

In addition to the features of any of the seven previous paragraphs, in certain example embodiments, the relative humidity in the environment may be 90-95%.

In addition to the features of any of the eight previous paragraphs, in certain example embodiments, the bonding fully may fully cure the paint by driving off all organic components initially provided therein.

In addition to the features of any of the nine previous paragraphs, in certain example embodiments, the paint, when fully cured, may form a colored pattern, and the first glass substrate may have a surface stress less than about 250 psi in an area proximate the colored pattern.

In addition to the features of the previous paragraph, in certain example embodiments, the surface stress may be less than about 150 psi in the area proximate the colored pattern.

In addition to the features of any of the 11 previous paragraphs, in certain example embodiments, the paint at least initially may have an inorganic base.

In addition to the features of any of the 12 previous paragraphs, in certain example embodiments, a hole may be cut in the first glass substrate after said screen printing, with the hole being sized and shaped to accommodate art or a picture of a predetermined size.

In addition to the features of the previous paragraph, in certain example embodiments, inner edges of the hole may be finishing so as to provide a bevel, miter, notch, rib, edge seam, and/or the like.

In addition to the features of any of the 14 previous paragraphs, in certain example embodiments, the first glass substrate may be laminated to a cover substrate to form an assembly in which the screen printed major surface is provided as the second surface of the assembly, the first glass substrate may be affixed to a cover substrate using a plurality of mechanical fasteners to form an assembly in which the screen printed major surface is provided as the second surface of the assembly, the first glass substrate may be affixed to a cover substrate using double-sided tape to form an assembly in which the screen printed major surface is provided as the second surface of the assembly, and/or the like.

In addition to the features of the previous paragraph, in certain example embodiments, the cover substrate may be made of glass.

In addition to the features of either of the two previous paragraphs, in certain example embodiments, the cover substrate and/or the first glass substrate may be heat treated.

In addition to the features of any of the three previous paragraphs, in certain example embodiments, an antiglare and/or UV-blocking coating may be provided, directly or indirectly, on the first glass substrate and/or the cover substrate.

In addition to the features of any of the 18 previous paragraphs, in certain example embodiments, an antiglare and/or UV-blocking coating may be provided, directly or indirectly, on the first glass substrate, over the desired pattern.

In certain example embodiments, a method of making a glass mat inclusive picture frame is provided. The method includes applying, in connection with one more materials chosen from enamels, lacquers, and paints, a desired pattern on a first major surface of a glass substrate. The one or more materials on the first major surface of the glass substrate may be cured. Following the curing, a central portion of the glass substrate may be cut out to create a hole having a size and shape selected to accommodate a picture of a defined size and form a glass mat. A cover substrate is coupled to the glass mat in making the picture frame.

In addition to the features of the previous paragraph, in certain example embodiments, an outer member may be connected along peripheral edges of the glass mat and/or cover substrate in making the picture frame.

In addition to the features of the previous paragraph, in certain example embodiments, the outer member may have one or more slots and/or grooves for accommodating the peripheral edges of the glass mat and/or cover substrate.

In addition to the features of any of the three previous paragraphs, in certain example embodiments, a backing member for the frame may be provided.

In certain example embodiments, a method of making a plurality of picture frame products is provided. One or more desired patterns is/are screen printed, in connection with one more paints, on a first major surface of a large area glass substrate. The one or more paints is/are cured. Following the curing, the large area glass substrate is cut into a plurality of glass blanks of one or more predetermined sizes, with each said glass blank having a desired pattern registered thereon. Central portions of each of the glass blanks are cut out to create holes having respective sizes and shapes selected to accommodate pictures of defined sizes and to form corresponding glass mats.

In addition to the features of the previous paragraph, in certain example embodiments, at least some of the glass mats may be heat treated.

In addition to the features of either of the two previous paragraphs, in certain example embodiments, cover substrates may be coupled to the glass mats in making the picture frame products.

In certain example embodiments, a method of making a picture frame product comprising a glass substrate and a colored film is provided. A paint is screen printed, directly or indirectly, on a major surface of the substrate in a desired pattern, while maintaining an environment with a relative humidity of at least 80% over and/or proximate to a screen mesh used in the screen printing. The substrate with the paint thereon is heated. The paint is (a) fully cured when heated to a first temperature of 250-400 degrees C., and (b) substantially fully cured when heated to a second temperature below 175 degrees C., in making the coated article.

In addition to the features of the previous paragraph, in certain example embodiments, the paint may be pushed through the screen mesh, and the resulting deposit may be controlled, in connection with hydraulic forces that account for a sheer thinning property of the paint by balancing squeegee speed, squeegee angle relative to the screen mesh, and hardness of the squeegee.

In addition to the features of either of the two previous paragraphs, in certain example embodiments, the screen mesh may have at least 200 threads per inch.

In certain example embodiments, a method of making a laminated picture frame product is provided, with the method comprising (for example) booking together a second glass substrate and a picture frame product made according to the method of any one of three previous paragraphs.

In addition to the features of the previous paragraph, in certain example embodiments, the second glass substrate and the coated article may be bent at a third temperature that is at least twice as high as the first temperature and at least three times as high as the second temperature, and the second glass substrate and the coated article may be laminated together in making the laminated picture frame product.

In certain example embodiments, a method of making a picture frame is provided. A colored paint material is printed, directly or indirectly, on a major surface of a first glass substrate in a desired pattern in connection with a mesh that has at least 100 threads per inch, with the colored paint material being pushed through the mesh in connection with hydraulic forces that account for a sheer thinning property of the colored paint material by balancing (a) squeegee speed, (b) squeegee angle relative to the mesh, and (c) hardness of the squeegee. The first glass substrate with the colored paint material thereon is heated to a first temperature sufficient to at least partially cure the colored paint material. The colored paint material is bonded to the first glass substrate in the desired pattern by heating the first glass substrate to a peak temperature that is no higher than 400 degrees C.

In addition to the features of the previous paragraph, in certain example embodiments, the first glass substrate may be heat treated, following the bonding, at a temperature of at least 580 degrees C., with the colored paint material remaining on the first glass substrate in the desired and with a desired coloration following said heat treating.

In addition to the features of either of the two previous paragraphs, in certain example embodiments, the mesh may have at least 230 threads per inch.

In addition to the features of any of the three previous paragraphs, in certain example embodiments, an environment may be maintained with a relative humidity of at least 80% over and/or proximate to the mesh while printing.

In addition to the features of any of the three previous paragraphs, in certain example embodiments, the first glass substrate may have a surface stress less than about 150 psi proximate the bonded colored paint material.

In certain example embodiments, a picture frame may be made according to the method of any one of 36 previous paragraphs (for example).

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of making a frame, the method comprising:
    screen printing a water-inclusive paint, directly or indirectly, on a major surface of a first glass substrate in a desired pattern in connection with a screen mesh that has at least 100 threads per inch and while maintaining an environment that has a relative humidity of at least 80% over and/or proximate to the screen mesh, the water-inclusive paint at least initially comprising 20-50 wt. % sodium silicate inclusive material(s) and 15-20% potassium silicate;
    bonding the paint to the first glass substrate in the desired pattern by heating the first glass substrate to a first temperature of from 125-150 degrees C. and maintaining the first temperature to cause a majority of organic components in the paint to be driven off, and thereafter heating the first glass substrate to a peak temperature that is at least twice as high as the first temperature and that is no higher than 400 degrees C.; and
    thereafter heat treating the first glass substrate, following the bonding, at a temperature of at least 580 degrees C., the paint remaining on the first glass substrate in the desired pattern and with a desired coloration following said heat treating.

2. The method of claim 1, further comprising following said bonding and prior to said heat treating, cutting the first glass substrate to a desired size.

3. The method of claim 1, wherein the first temperature is held for about 4 minutes.

4. The method of claim 1, wherein the screen mesh has fewer than 200 threads per inch, the threads per inch being selected so as to achieve full flood.

5. The method of claim 1, wherein the relative humidity in the environment is 90-95%.

6. The method of claim 1, wherein the bonding fully cures the paint by driving off all organic components initially provided therein.

7. The method of claim 1, wherein the paint, when fully cured, forms a colored pattern, and the first glass substrate has a surface stress less than about 250 psi in an area proximate the colored pattern.

8. The method of claim 7, wherein the surface stress is less than about 150 psi in the area proximate the colored pattern.

9. The method of claim 1, wherein the paint at least initially has an inorganic base.

10. The method of claim 1, further comprising cutting a hole in the first glass substrate after said screen printing, the hole being sized and shaped to accommodate art or a picture of a predetermined size.

11. The method of claim 10, further comprising finishing inner edges of the hole so as to provide a bevel, miter, notch, rib, and/or edge seam.

12. The method of claim 1, further comprising laminating the first glass substrate to a cover substrate to form an assembly in which the screen printed major surface is provided as the second surface of the assembly.

13. The method of claim 12, wherein the cover substrate is made of glass.

14. The method of claim 12, wherein the cover substrate and/or the first glass substrate is/are heat treated.

15. The method of claim 12, further comprising providing an antiglare and/or UV-blocking coating, directly or indirectly, on the first glass substrate and/or the cover substrate.

16. The method of claim 1, further comprising affixing, using a plurality of mechanical fasteners, the first glass substrate to a cover substrate to form an assembly in which the screen printed major surface is provided as the second surface of the assembly.

17. The method of claim 1, further comprising affixing the first glass substrate to a cover substrate using double-sided tape to form an assembly in which the screen printed major surface is provided as the second surface of the assembly.

18. The method of claim 1, further comprising providing an antiglare and/or UV-blocking coating, directly or indirectly, on the first glass substrate, over the desired pattern.

* * * * *